March 28, 1944. J. L. ANDERSON 2,345,314
CUTTING MACHINE
Filed Aug. 26, 1941 6 Sheets-Sheet 1
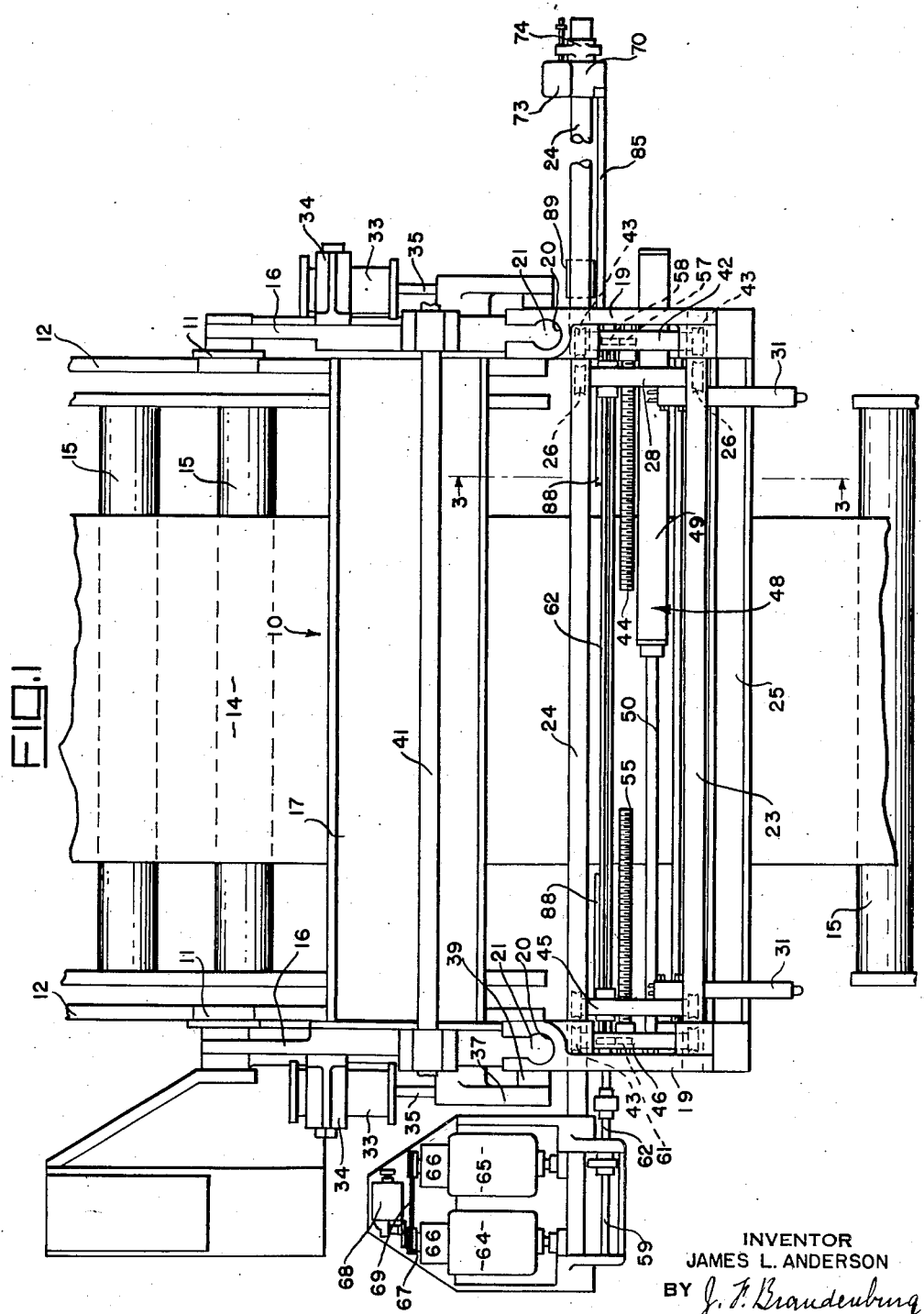
INVENTOR
JAMES L. ANDERSON
BY J. F. Brandenburg
ATTORNEY

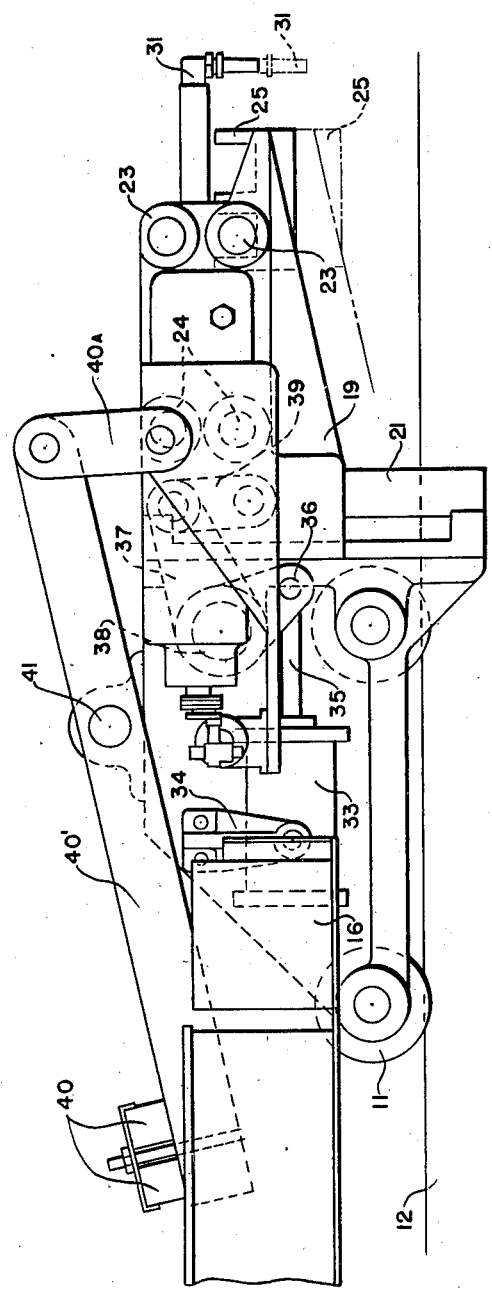

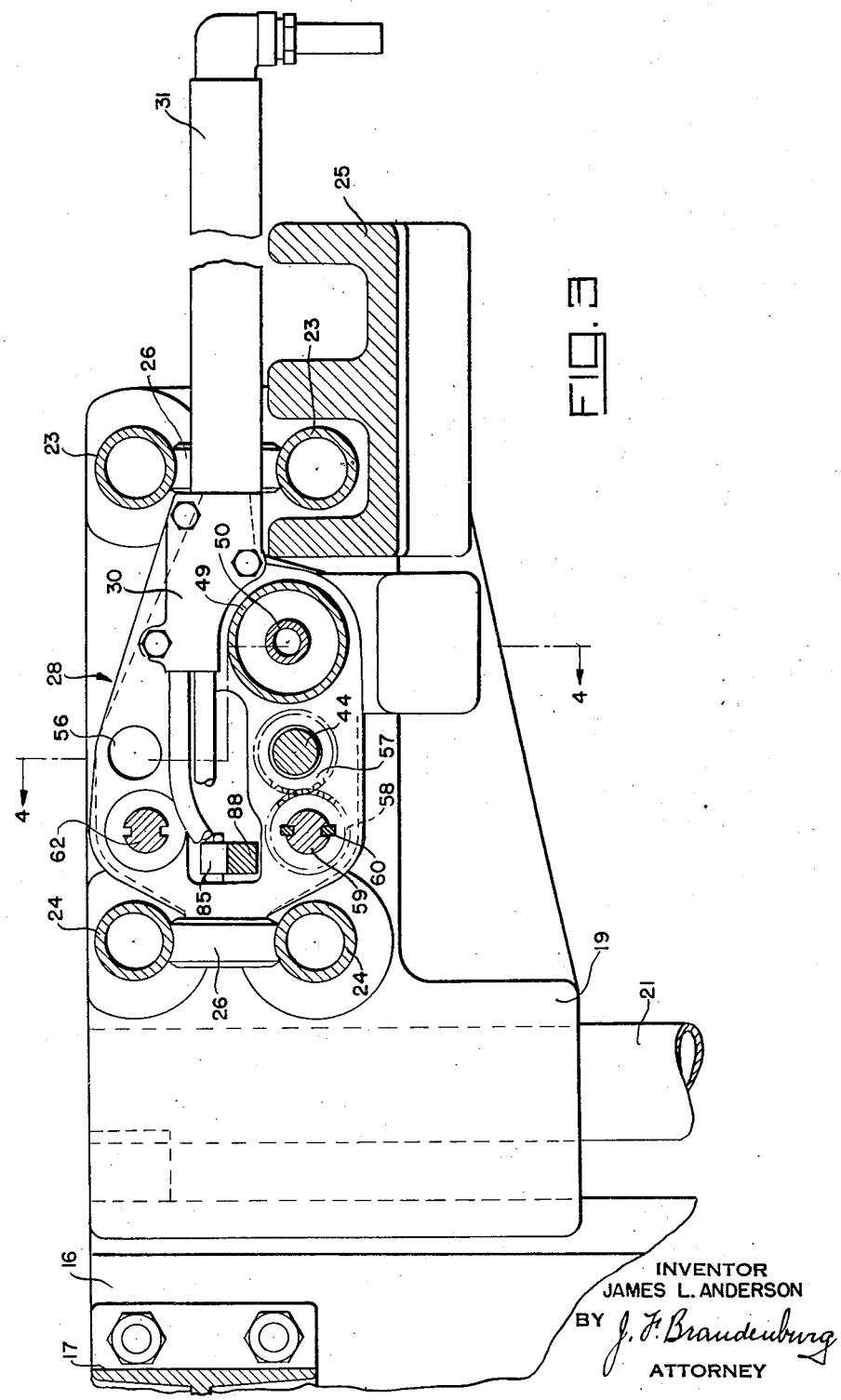

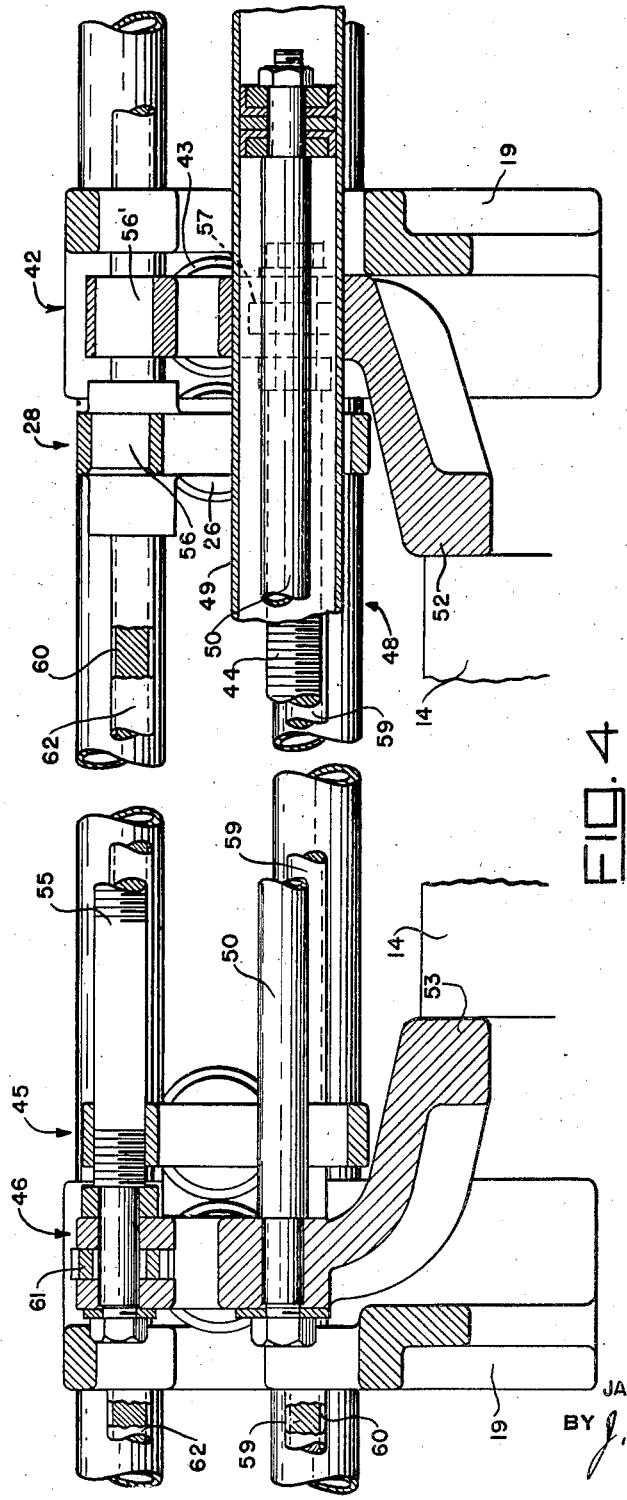

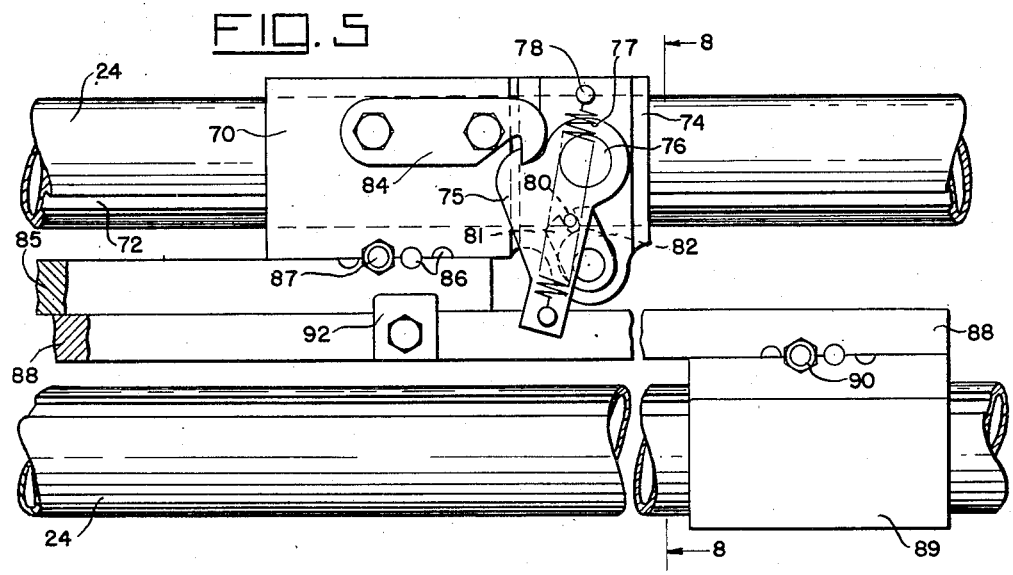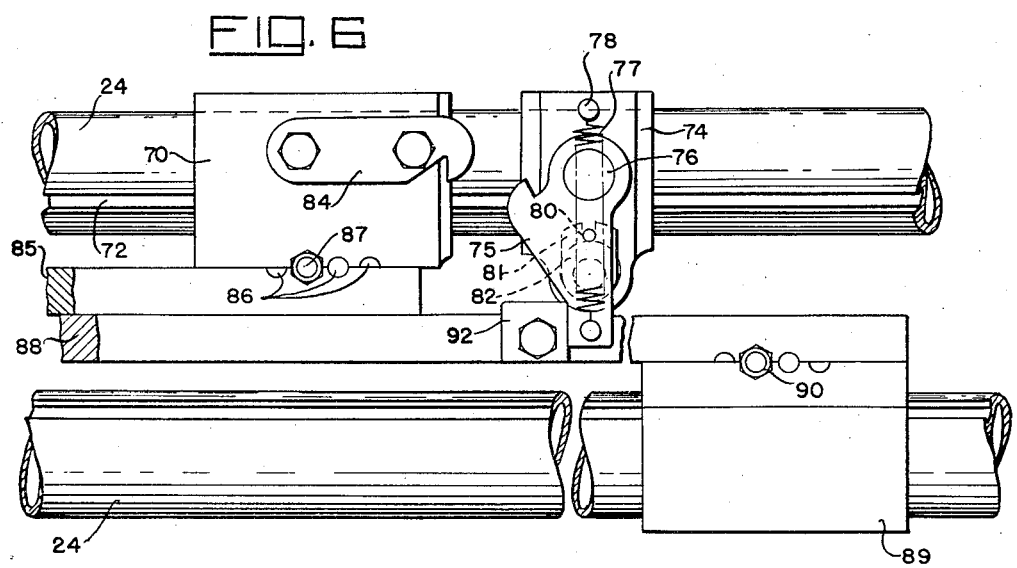

March 28, 1944. J. L. ANDERSON 2,345,314
CUTTING MACHINE
Filed Aug. 26, 1941  6 Sheets-Sheet 6
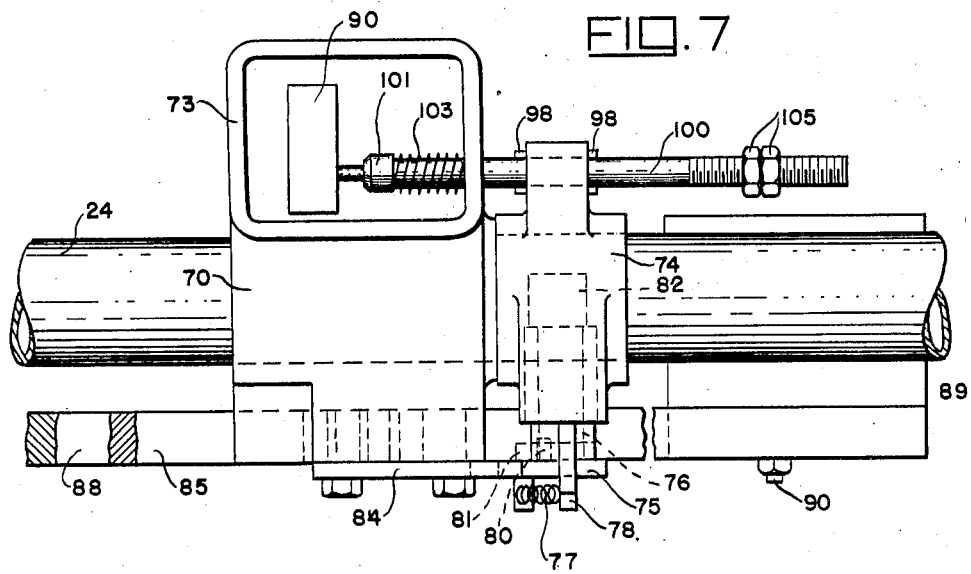
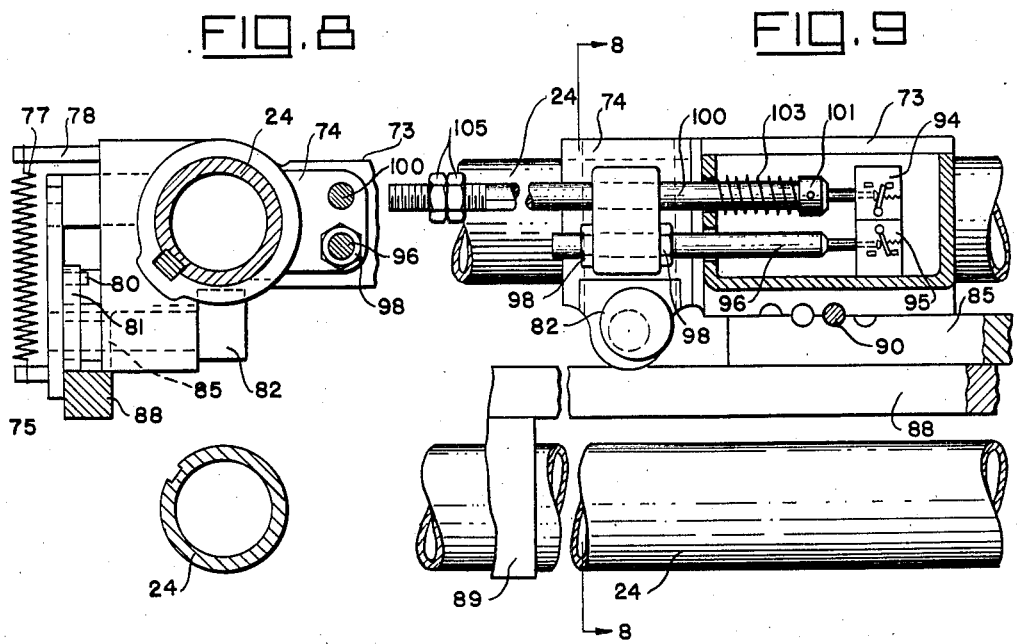
INVENTOR
JAMES L. ANDERSON
BY J. F. Brandenburg
ATTORNEY

Patented Mar. 28, 1944

2,345,314

UNITED STATES PATENT OFFICE 2,345,314

CUTTING MACHINE

James L. Anderson, Closter, N. J., assignor to Air Reduction Company, Incorporated, New York, N. Y., a corporation of New York Application August 26, 1941, Serial No. 408,320

22 Claims. (Cl. 266—23)

This invention relates to cutting machines, and more especially to machines for cutting hot slabs, though in its broadest aspects the invention is not limited to apparatus for that purpose.

It is an object of the invention to provide improved apparatus for locating a cutting torch in position to start a cut at the edge of a work piece, and for then moving the torch progressively across the piece to be cut. Slabs that move along a conveyer are not always centered on the conveyer, and they are of different widths. This invention includes a carriage that moves out over the conveyer table until an abutment on the carriage strikes the side of the slab. The cutting apparatus is connected with the carriage in such relation that a cutting torch is in position to start a cut from one end of the slab when the abutment of the carriage comes against the side of the slab. In this way the torch is quickly positioned regardless of the width of the slab or the amount that the slab may be to one side or the other of the center of the conveyer or mill table. Another object of the invention is to provide automatic means for positioning two torches at opposite sides of a slab or other work piece and then moving the torches toward one another along an intended line of cut. In accordance with one feature of the invention two carriages are moved together by means that reacts against both so that when either carriage comes against the side of a slab, the other carriage continues to move until it too contacts with the slab.

Other features of the invention relate to automatic control of the two torches that move toward one another from opposite sides of the work piece. The automatic control obtains a stoppage and reversal of one torch when it approaches within a given distance of the second torch and a delayed reversal of the second torch which occurs only after that torch has continued its cut up to the point where the first torch stopped.

One advantage of the two torches that cut simultaneously is that the time required to cut a slab is reduced almost 50% and the cutting operation thereby causes less delay in the passage of the slabs along the conveyer and is less likely to be a "bottleneck" in the mill production.

Other objects, features and advantages of the invention will appear or be pointed out as the specification proceeds.

In the accompanying drawings, forming part hereof:

Fig. 1 is a top plan view of a slab cutting machine embodying the invention.

Fig. 2 is an enlarged side elevation showing the left side of the machine of Fig. 1.

Fig. 3 is an enlarged sectional view taken on the line 3—3 of Fig. 1.

Fig. 4 is a sectional view on the line 4—4 of Fig. 3.

Fig. 5 is an enlarged front elevation of the automatic control means for stopping and reversing the movement of the torches at the end of a cutting operation.

Fig. 6 is a view similar to Fig. 5 but showing the parts in different positions.

Fig. 7 is a top plan view of the structure shown in Fig. 5.

Fig. 8 is a sectional view on the line 8—8 of Figs. 5 and 9.

Fig. 9 is a rear elevation of the control means shown in Fig. 5.

The cutting machine shown in Fig. 1 includes a main carriage 10 with four flanged wheels 11 that stably support the carriage and run along rails 12 on opposite sides of a conveyer comprising rollers 15. The upper framework of the main carriage straddles the conveyer and has enough clearance to permit a metal body comprising a slab 14, or other work piece, to pass under this upper framework.

The main carriage includes fixed side frames 16 rigidly connected by a cross beam 17. These side frames 16 are fixed with respect to the axles of the wheels 11, and only move when the entire carriage travels along the rails 12.

The main carriage has a vertically movable portion comprising movable side frames 19 with arcuate bearings 20 that are vertically movable on guides 21 at the forward ends of the fixed side frames 16. These vertically movable side frames 19 are connected to form a rigid composite frame structure by tubes 23, 24 and a gauge bar 25.

There are two tubes 23, one below the other as shown in Fig. 3, and there are two tubes 24. These tubes 23, 24 serve as guide rails for grooved wheels 26 of a torch carriage 28. The wheels 26 run on the lower tubes 23 and 24, and there is small clearance between the upper tubes 23, 24 and the tops of the wheels 26. These upper tubes 23 and 24 serve as guard rails to prevent the wheels 26 from being displaced upward from the lower tubes.

A torch holder 30 attached to the carriage 28 supports a torch 31 in position to direct a cutting jet against the slab 14. During the cutting operation the vertically movable portion of the main carriage is in a lowered position and supported by the gauge bar 25 that rests directly on the slab 14. The gauge bar has a scalloped bottom surface to reduce the transfer of heat from the hot slab 14 to the metal of the gauge bar.

The vertically movable portion of the main carriage is raised and lowered by cylinder-and-piston motors 33 (Fig. 1). The cylinders of these motors are connected to the fixed side frames 16 by brackets 34 in which the cylinders are held by pivots so that the motors can oscillate to allow for changes in the obliquity of their piston rods. The motion-transmitting mechanism by which the motors 33 raise and lower the vertically movable side frames 19 comprises a simple link mechanism such as shown in Fig. 2. The piston rod 35 of the motor 33 is connected by a pivot 36 to a downwardly extending arm of a bell crank 37 that rocks about a fulcrum 38 extending out from the fixed side frame 16. A forwardly extending arm of the bell crank 37 is connected with the vertically movable frame 19 by a short link 39. Movement of the piston rod 35 to the right in Fig. 2 rocks the bell crank 37 counter-clockwise and causes the link 39 to pull the side frame 19 upward along the guide 21. Operation of the motor 33 in the reverse direction causes the vertically movable portion of the main carriage to move downward until the gauge bar 25 rests on the work to be cut. Each of the motors 33, on the opposite sides of the machine, operates similar link mechanism. The weight of the vertically movable side frames 19 and the structure connected to them is counterbalanced by weights 40 that are clamped to and adjustable along a lever 40', the forward end of which is connected with the vertically movable side frame 19 by a link 40ᵃ. There is a similar counter-balance on each side of the machine, and the levers 40' are supported by a fulcrum shaft 41 attached to the fixed frames 16.

A screw carriage 42 (Fig. 1) is associated with the torch carriage 28. This screw carriage has grooved wheels 43, similar to the wheels 26 of the torch carriage 28, and that run on the tubes 23, 24 as rails. A lead screw 44 is supported at one end in bearings in the screw carriage. This lead screw can rotate in the bearings, but is held against longitudinal movement so that it moves longitudinally as a unit with the carriage 42 when the carriage travels along the tubes 23, 24.

The lead screw 44 threads through the body of the torch carriage 28 so that rotation of the lead screw in one direction thrusts the torch carriage 28 along the tubes 23, 24 away from the screw carriage 42, whereas rotation in the other direction moves these carriages 28 and 42 closer together.

At the opposite (left) side of the machine there is a torch carriage 45 and a screw carriage 46 similar to the corresponding carriages 28 and 42, respectively, at the right side of the machine but with certain structural reversals necessary for use on the opposite side of the cutting machine.

The screw carriages 42 and 46, at the opposite sides of the machine, are connected together by a cylinder-and-piston motor 48 comprising a cylinder 49 that is secured near one end to the screw carriage 42 and a piston rod 50 that is fastened to the screw carriage 46.

The motor 48 is double acting. Admission of working fluid, such as air, to the right end of the cylinder 49 causes the screw carriages 42 and 46 to be moved away from one another. Admission of working fluid to the other end of the cylinder 49 moves the screw carriages 42 and 46 closer together.

The screw carriage 42 has a downwardly and rearwardly extending bumper or abutment 52 (Fig. 4) that strikes against the side of the slab 14 to prevent further inward movement of the screw carriage 42. There is a similar bumper or abutment 53 on the screw carriage 46. One advantage of having the cylinder 49 connected to one of the screw carriages and the piston rod 50 connected to the other screw carriage is that the motor continues to move the other carriage regardless of how soon the abutment of the first carriage strikes the side of the slab. The two screw carriages 42 and 46 are thus moved into positions with their abutments 52 and 53 against the sides of the slab 14 regardless of how much off-center the slab may be on the mill table or conveyer.

Pressure of working fluid in the motor 48 holds the abutments against the side of the slab. Thus the screw carriages 42 and 46 serve as "positioning carriages" for initially locating the torch carriages 28 and 45.

As the screw carriages 42, 46 are moved toward one another by the motor 48, the torch carriages 28 and 45 move with the screw carriages 42, 46. When the abutments 52, 53 are against the sides of the slab 14, and the torch carriages 28 and 45 are as close as possible to their respective screw carriages 42 and 46, the torches on the carriages 28 and 45 are in position to start cuts on the slab 14 at opposite sides of the slab.

The screw 44 is rotated, by driving mechanism that will be described, to move the torch carriage 28 inward, and traverse the torch over the slab during the cutting operation. At the same time a lead screw 55, supported by the screw carriage 46, is rotated to drive the torch carriage 45 inward and move its torch over the slab.

The lead screws 44 and 55 are at different levels so that the inner end of one can extend under the other when operating on narrow slabs that require the screw carriages to be spaced by a distance less than the combined lengths of the lead screws 44, 55. There is an opening 56 in the torch carriage 28 in line with the screw 55 and a similar alined opening 56' in the screw carriage 42 into which the lead screw 55 extends when the screw carriages 42 and 46 are close together. There are similar openings in the left-hand carriages 45 and 46 for the lead screw 44.

A gear 57 keyed to the bearing end of the lead screw 44 is driven by a gear 58 (Fig. 3) that is enclosed on both sides by the screw carriage 42 that slides along a shaft 59. Keys in the gear 58 slide in grooves 60 in the shaft 59 so that the gear 58 rotates with the shaft 59 but can at the same time move lengthwise along the shaft 59 when the screw carriage 42 travels along the rails 23, 24.

The lead screw 55 (Fig. 4) has a gear 61 keyed to the bearing end of the screw, and this gear is driven from a shaft 62 in the same manner as the gear 57 of the lead screw 44 is driven from the lower drive shaft 59. The lower shaft 59 is driven by an electric motor 64 (Fig. 1) through reduction gearing, and the upper shaft 62 is driven by a motor 65. The rate at which the cutting torches 31 move across the slab depends upon the speed of the motors 64 and 65, and each of these motors is equipped with an adjustable centrifugal governor 66.

The governor of the motor 64 has an adjusting knob 67 that is turned in one direction or the other to increase or decrease the speed at which the governor becomes effective. The knob 66 is rotated by a motor 68 through reduction gearing. The adjusting knob of the governor for the motor 65 is connected with the knob 67 by a belt 69 so that both of the governors are adjusted in unison by the motor 68.

Since the torches 31 of both torch carriages cut along the same straight line, limit switches are provided for automatically stopping the torch carriages before the torches strike one another. The limit switches are constructed and arranged so that they cause the left-hand torch carriage 45 to stop and reverse while the right-hand torch carriage 28 continues to move inward. The switch-operating mechanism is adjusted so that the torch carriage 28 will continue to move until the cut made by the right-hand torch 31 joins the cut made by the torch on the left-hand torch carriage, and thereby completes the severing of the slab. The right-hand torch carriage 28 then reverses and returns to its starting position. The apparatus for effecting this operation is shown in Figs. 5–9.

Referring first to Fig. 5, a switch-box support 70 is a sliding fit on the upper tube 24. A key that slides in a slot 72 in the upper tube 24 prevents the switch-box support 70 from turning on the tube. A limit switch-box 73 (Fig. 7) is connected to the back of the support 70. The box 73 and support 70 may be made in one piece.

A limit switch operator 74 is a sliding fit on the upper tube 24 and is held against rotation on the tube by a key that slides in the slot 72. A latch 75 is supported from the front of the operator 74 by a pivot 76 (Fig. 6). A spring 77 is connected at its lower end to the latch 75 and is connected at its upper end to a stud 78 that extends from the switch operator 74. This spring 77 urges the latch 75 either clockwise or counterclockwise depending upon which side of the center of the pivot 76 the spring 77 passes for the particular position in which the latch 75 happens to be.

A pin 80 extends from the back face of the latch 75 and into a slot in the top end of a crank 81 that operates an eccentric brake 82. When the latch 75 is in the position shown in Fig. 6, the spring 77 urges the latch to move counterclockwise around the pivot 76. With the latch 75 in this position the eccentric brake 82 is turned into a position in which it clamps against the bottom side of the upper tube 24. Any further movement of the latch 75 in a counterclockwise direction moves the pin 80 to the right, rocks the crank 81 and eccentric brake 82 clockwise and causes the eccentric brake to clamp more firmly against the tube 24.

During most of the operation of the apparatus the limit switch operator 74 is up against the end of the switch-box support 70, and is held in such position by a latch plate 84 that is secured to the support 70, and has a hook end with which a complementary portion of the latch 75 engages, as shown in Fig. 5. The limit-switch support 70 is connected with the right-hand torch carriage 28 by a square rod 85. Semicylindrical grooves 86 in the rod 85 register with similar grooves in the support 70 to provide openings for a clamping bolt 87 that fastens the rod 85 to the support 70. The distance of the support 70 from the torch carriage can be adjusted by bringing different grooves 86 of the rod 85 into register with other ones of the grooves of the limit switch support 70.

Another square rod 88 connects the left-hand torch carriage 45 with a tube traveler 89 that slides on the lower tube 24. The traveler 89 is adjustably connected with the square rod 88 by a clamping screw 90 in the same manner as the clamping screw 87 fastens rod 85 to the limit switch support 70.

An abutment 92 is secured to the rod 88 in position to strike the lower end of the latch 75 whenever the two torches are moved by their carriages to within about two inches of one another.

Since the limit switch support 70 and rod 85 move as a unit with the right-hand torch carriage 28, and the abutment 92 and rod 88 move as a unit with the left-hand torch carriage 45, the parts will always occupy the same positions with respect to each other, when the torches are two inches apart, regardless of how much off-center the slab may be on the mill table or conveyer.

The limit switch operator 74 is latched to the limit switch support 70 and moves to the left in Fig. 5, and the abutment 92 moves to the right, during each cutting operation, until the abutment strikes the lower end of the latch 75, rocks the latch counterclockwise out of engagement with the latch plate 84, and stops the travel of the limit switch operator 74 along the tube 24. The limit switch support 70 continues to move toward the left and pulls away from the switch operator 74 as indicated in Fig. 6. It is this relative movement of the limit switch support 70 and the limit switch operator 74 that causes the operation of the limit switches that are carried by the support 70. As the abutment 92 moves the latch 75 further in a counterclockwise direction, it causes the pin 80 to move the crank 81 and clamp the eccentric brake 82 firmly against the tube 24.

There are two limit switches 94 and 95 (Fig. 9) in the switch box 73 carried by the limit switch support 70. A rod 96 extends through the limit switch operator 74 and through an opening in the wall of the switch box 73. This rod is threaded throughout at least a portion of its length and is held in a fixed position with respect to the limit switch operator by nuts 98 threaded on the rod 96 and clamping against opposite sides of the limit switch operator. These nuts provide a means for adjusting the position of the rod 96 lengthwise with respect to the limit switch operator 74.

Both of the limit switches 94 and 95 are single pole, double throw, snap switches with a bias toward the left when viewed from the back as in Fig. 9. The positions of the nuts 98 are adjusted so that the rod 96 contacts with the button of the limit switch 95 and holds the pole of that limit switch against the right-hand contact of the switch when the operator 74 is up against the end of the support 70 as shown in Fig. 9 and Fig. 5. As soon as the support 70 moves away from the operator 74, as illustrated in Fig. 6, the rod 96 (Fig. 9) moves away from the limit switch 95 and the bias of the switch causes the pole to shift over into contact with the left pole of the limit switch 95. This operation of the switch 95 causes the motor driving the left-hand torch carriage to stop and reverse.

An upper rod 100 extends through the operator 74 and through the side of the switch box 73. The rod 100 has a head 101 inside of the switch box 73. The head 101 is pinned on the rod 100 and a spring 103, compressed between the head 101 and the wall of the switch box 73, holds the end of the rod 100 against the button of the limit switch 94. The spring 103 is stronger than the bias of the switch 94 and holds the pole of the switch 94 against the right-hand contact in Fig. 9. Whenever the pressure of the spring 103 is removed from the button of switch 94, the bias of this switch shifts the pole over to the left-hand contact of the switch and causes the motor that drives the right-hand torch carriage 28 to reverse.

There are two nuts 105 threaded on the end of the rod 100 remote from the switch box 73. When the switch box 73 moves away from the operator 74 far enough for the nuts 105 to strike against the operator 74 then further movement of the switch box 73 away from the operator 74 causes the spring 103 to be compressed and its pressure released from the upper limit switch 94 so that the pole of this limit switch shifts over against its left-hand contact, as previously described.

Referring to Figs. 1 and 9, when the poles of the limit switches 94 and 95 are against the right-hand contacts (in Fig. 9), and the motor circuits are not opened by other switches, both of the motors 64 and 65 operate and in directions that cause the torch carriages 28 and 45 to move toward one another. Shifting of the pole of the lower limit switch 95 over against the left-hand contact of that switch reverses the direction of rotation of the motor 65 and causes the torch carriage 45 to reverse and move back toward the screw carriage 46.

Shifting of the pole of the upper limit switch 94 over against the left-hand contact of that switch reverses the direction of rotation of the motor 64 and causes the torch carriage 28 to move away from the torch carriage 45. The nuts 105 on the rod 100 are adjusted to such a position that the torch carriage 28 does not reverse until its torch 31 has cut far enough to meet the cut made by the torch of the other carriage.

Limit switches for stopping the motors 64 and 65 when the torch carriages 28 and 45 have been moved back against the screw carriages 42 and 26 are not illustrated. Such switches, as well as starting switches and the motor circuits, are well understood and a description of them is not necessary for a full understanding of this invention. Various changes and modifications can be made in the illustrated embodiment of the invention, and some features can be used without others without departing from the invention as defined in the claims.

I claim:

1. Apparatus for cutting a metal body, said apparatus including a carriage, supporting means along which the carriage moves, an abutment on the carriage in position to contact with the side of the body to be cut, a torch holder moved by said carriage into position to start a cut at the edge of the metal body when the abutment is against the side of the body, supporting means on which the torch holder is movable, and means on the carriage for causing the torch holder to move on its supporting means and with respect to the carriage along a projected line of cut.

2. A torch cutting machine including a first carriage, supporting means along which said carriage moves, means for positioning the first carriage including an abutment on said carriage for contact with a side of a metal body that is to be cut, a second carriage connected with the first carriage and movable as a unit with the first carriage while originally positioning the first carriage, a torch holder on the second carriage for positioning a torch at the edge of a metal body in position to start the cut when said abutment is against the side of the metal body and the carriages are in a predetermined relation with one another, and means on the first carriage for moving the second carriage with respect to the first carriage to traverse a torch across the metal body along the line to be cut.

3. Torch cutting apparatus including two wheeled carriages, guide means on which the wheels run, a torch holder on one of the carriages, means connecting the torch holder carriage and the other carriage for movement as a unit when originally positioning the torch holder to locate a torch carried by the holder in position to start a cut, an abutment for stopping said other carriage in a given position, and means for causing further movement of the torch-holder carriage independently of said other carriage to move a torch along the desired line of cut.

4. In a machine for cutting metal bodies, positioning carriages located on opposite sides of a body to be cut, supporting means along which the carriages move toward and from one another, an abutment on each carriage in position to strike against the metal body and limit the movement of the carriages toward one another, a torch holder connected with each carriage, supporting means on which each torch holder is movable with respect to its carriage, and mechanism for moving the torch holders across the metal body independently of said carriages after the abutments have stopped further movement of said carriages.

5. Apparatus for cutting a metal body including in combination supporting means, two carriages movable toward and from one another and located at opposite sides of the metal body to be cut, a holder connected with each carriage for supporting a torch, an abutment on each carriage in position to strike against a side of the metal body when the carriage moves into a position that locates its associated torch in position to start a cut at one edge of the metal body, and power means for moving the carriages on opposite sides of the body toward each other and against the sides of the body even though the body is not centered between the carriages, said power means including a variable-length connection between the carriages and means for causing variations in said length.

6. In a cutting machine including torch supports that move torches across a work piece from opposite sides, an additional device for moving the torch supports into an original starting position, said device comprising a cylinder-and-piston motor with the cylinder connected with the torch support on one side of the work piece, and the piston connected with the torch support on the other side of the work piece.

7. Torch cutting apparatus comprising a conveyer for supporting a metal body that is to be cut, a track comprising tubular members extending across the conveyer above the metal body and transversely of the direction of movement of the metal body along the conveyer and for a distance substantially greater than the width of the metal body to be cut, a first carriage movable along the track from one end, a torch-supporting carriage movable along the track in front of the first carriage, a lead screw connecting the first carriage and the torch-supporting carriage for causing the carriage to move along the track as a unit when the lead screw has no angular movement, mechanism for rotating the lead screw to cause the torch-supporting carriage to move forward with respect to said first carriage, an abutment on said first carriage in position to strike against the side of the metal body for originally positioning the carriages prior to starting a cut, similar carriages movable along the track from the other end, and a cylinder-and-piston fluid motor with its cylinder connected to said first carriage and having a piston rod connected with the corresponding carriage at the other end of the track.

8. A torch cutting machine including two carriages positioned one ahead of the other and independently supported, a torch holder on the forward carriage, a lead screw connecting the carriages for movement as a unit while the lead screw has no angular movement, and means for rotating the lead screw to cause the forward carriage to move with respect to the rearward carriage and traverse a torch along a desired line of cut.

9. A torch cutting machine including two positioning carriages disposed in positions on opposite sides of a metal body to be cut, carriage-supporting means on which the carriages are movable toward and from one another for initially positioning cutting torches at opposite edges of the metal body, a torch-holder carriage for each of said positioning carriages, said torch-holder carriages being movable along the carriage-supporting means, and connections between each of the positioning carriages and its torch-holder carriage, said connections being constructed and arranged to cause the connected carriages to move into starting position as a unit, but operable to move the torch-holder carriage independently of the positioning carriage during a cutting operation.

10. A torch cutting machine including two positioning carriages disposed in positions on opposite sides of a metal body to be cut, carriage-supporting means on which the carriages are movable toward and from one another for initially positioning cutting torches at opposite edges of the metal body, a torch-holder carriage for each of said positioning carriages, said torch-holder carriages being movable along the carriage-supporting means, and connections extending from each of the positioning carriages to its torch-holder carriage, and beyond said torch-holder carriage on the side toward the carriages at the other side of the work piece, said connections being operable to shift the torch-holder carriages toward and from one another independently of the positioning carriages, and being located at different levels so that one can overlie the other when the positioning carriages are close together.

11. A torch cutting machine including guides that extend across and beyond both sides of a metal body to be cut, a wheeled carriage movable along the guides from one side of the metal body, a lead screw supported by the carriage, another wheeled carriage on the guide and through which the lead screw threads so that both carriages move as a unit when the screw has no rotary movement but have relative movement when the screw rotates, said screw extending parallel with the guides and for a substantial distance beyond the carriage through which it threads, a torch-holder on the carriage through which the screw threads, gears on the screw-supporting carriage including a driven gear secured to one end of the screw and a driving gear in mesh with said driven gear, a drive shaft of non-circular section extending parallel with the guides and through the driving gear which is a sliding fit on said drive shaft, a second screw-supporting carriage and a second torch-holder carriage for operation along the guides from the other side of the metal body, these second carriages being similar to the first-mentioned carriages but having a lead screw at a different level from the lead screw of the first carriages so that one lead screw can overlie the other, and an independent drive shaft for the screw associated with the second carriages, the carriages for each side of the work piece having clearance openings in alinement with the lead screw of the other carriages.

12. A torch cutting machine including a frame, vertically extending guides on which said frame is movable into and out of contact with a metal body to be cut, a track on the frame, a torch carriage movable along the track, and a holder on the carriage for positioning a torch in cutting relation to the metal body when said frame is in a lowered position and resting on the metal body to be cut.

13. A torch cutting machine comprising a main carriage that straddles a metal body that is to be cut, supporting means along which the carriage is movable longitudinally of the work piece, said main carriage including a frame that extends transversely across the work piece and is movable with respect to the remainder of the carriage up and down into and out of contact with the top surface of the metal body, a track on the frame, a torch carriage movable along the track, and a holder on the carriage for positioning a torch in cutting relation to the metal body when said frame is in a lowered position and resting on the metal body to be cut.

14. A torch cutting machine comprising a main carriage that straddles a metal body that is to be cut, supporting means along which the carriage is movable longitudinally of the work piece, said main carriage including a frame and having vertically extending guides on which said frame is movable toward and from the top of the metal body, motor means on that part of the carriage on which the guides are located, and link means connected with the movable frame and operated by said motor means to cause the frame to move up and down on said guides, said frame including a gauge bar that contacts with the metal body and supports the frame from said body when the frame is in its lowered position, parallel tubes forming a part of the frame and extending transversely of the metal body, a torch carriage with grooved wheels that fit the tubes and run on the tubes as track, and a torch holder on the carriage.

15. A torch cutting machine, including a guide, torch carriages movable along the guide from opposite ends of said guide for traversing torches along different parts of a projected cut, motor means for moving the torch carriages, and automatic control apparatus for stopping one of the torch carriages when it approaches within a given distance of the other.

16. A cutting machine including a guide, torch carriages movable along the guide from opposite ends of said guide for traversing torches along different parts of a projected cut, reversible, power operated, driving means for moving the torch carriages, and automatic control apparatus for reversing the operation of the driving means of one of the torch carriages when it approaches within a given distance of the other.

17. A torch cutting machine including two torch carriages movable simultaneously across a work piece and toward one another from opposite sides, means for supporting a torch from each of said carriages with the torches disposed to make different parts of a straight line cut, a separate motor for operating each of the carriages, and automatic control means for the motors operated by displacement of the carriages.

18. A torch cutting machine including two torch carriages, supports along which the carriages are movable to traverse cutting torches toward one another along a line of cut across a metal body from opposite edges of the body, operating mechanism for moving the torch carriages, and controls for the operating mechanism actuated by the movement of one carriage with respect to the other and independently of the positions of the carriages on said supports.

19. Torch cutting apparatus including two torch carriages that move toward one another from opposite edges of a work piece during a cutting operation, operating mechanism for the torch carriages, and automatic control devices that stop and reverse the operating mechanism of one torch carriage and subsequently stop and reverse the operating mechanism of the other torch carriage.

20. Torch cutting apparatus including two torch carriages that move toward one another from opposite edges of a work piece during a cutting operation, a separate motor for operating each of the carriages, motion-transmitting means between each motor and the carriage operated by that motor, a limit switch for each motor, and limit switch-operating means movable with at least one of the carriages and including a lost-motion connection that causes one of the limit switches to be operated ahead of the other.

21. A torch cutting machine including a track, two torch carriages movable toward one another along the track to traverse cutting torches across a metal body from opposite edges of the body, a separate motor for operating each of the carriages, motion-transmitting means between each motor and the carriage operated by that motor, a limit switch for each motor for stopping and reversing the motor, said limit switches being connected to and movable as a unit with one of the torch carriages, and an operator for each switch, said operators being connected to the other torch carriage, and one of said operators having a lost-motion connection that causes one of the limit switches to be operated ahead of the other.

22. Torch cutting apparatus including a track, two torch carriages movable toward and from one another along the track to move cutting torches inward across a work piece from opposite edges and then back to their original positions after completing the cut, a separate motor for operating each of the carriages, motion-transmitting connections between each motor and the carriage that is operated by that motor, a control switch for each motor, each switch having a bias toward a position that causes the motor to operate in the direction that moves the torch carriages closer together, but being operable into a position that causes the motor to reverse, a support by which both of the limit switches are carried, a guide along which the limit switch support moves, a connection between the limit switch support and one of the torch carriages for causing the support to move as a unit with that carriage, a switch operator movable along the guide, a latch for connecting the switch operator to the limit switch support, a brake on the switch operator for resisting movement of the switch operator along the guide, and an abutment member connected to and movable as a unit with the other toch carriage into position to release said latch and apply said brake when the torch carriages approach within a given distance of one another.

JAMES L. ANDERSON.